United States Patent
Heikkilä et al.

(10) Patent No.: US 10,838,098 B2
(45) Date of Patent: Nov. 17, 2020

(54) PILL REMOVAL DETECTION DEVICE

(71) Applicant: Popit Oy, Espoo (FI)

(72) Inventors: Timo Heikkilä, Kirkkonummi (FI); Marko Nirhola, Ojakkala (FI); Teemu Piirainen, Kirkkonummi (FI)

(73) Assignee: Popit Oy, Espoo (FI)

( * ) Notice: Subject to any disclaimer, the term of this patent is extended or adjusted under 35 U.S.C. 154(b) by 91 days.

(21) Appl. No.: 16/197,808

(22) Filed: Nov. 21, 2018

(65) Prior Publication Data

US 2019/0196042 A1 Jun. 27, 2019

(30) Foreign Application Priority Data

Dec. 22, 2017 (EP) .................................... 17209934

(51) Int. Cl.
| | | |
|---|---|---|
| *A61J 1/03* | (2006.01) | |
| *G01V 3/08* | (2006.01) | |
| *A61J 7/02* | (2006.01) | |
| *A61J 7/04* | (2006.01) | |

(52) U.S. Cl.
CPC ................. *G01V 3/08* (2013.01); *A61J 1/035* (2013.01); *A61J 7/02* (2013.01); *A61J 7/0418* (2015.05); *A61J 2200/30* (2013.01); *A61J 2200/70* (2013.01); *A61J 2200/72* (2013.01); *A61J 2205/60* (2013.01)

(58) Field of Classification Search
None
See application file for complete search history.

(56) References Cited

U.S. PATENT DOCUMENTS

| | | | |
|---|---|---|---|
| 2002/0017996 A1* | 2/2002 | Niemiec | A61J 7/0481 340/573.1 |
| 2005/0087473 A1* | 4/2005 | Fabricius | A61J 1/035 206/534 |
| 2016/0367435 A1 | 12/2016 | Ahmadi | |
| 2017/0294105 A1* | 10/2017 | Mehregany | A61J 1/035 |

(Continued)

FOREIGN PATENT DOCUMENTS

| | | |
|---|---|---|
| EP | 2113235 A1 | 11/2009 |
| EP | 2243460 A1 | 10/2010 |
| WO | 2008000479 A1 | 1/2008 |

(Continued)

OTHER PUBLICATIONS

European Search Report, European Patent Office, Application No. 17209934.3, dated Jun. 4, 2018, 9 pages.

*Primary Examiner* — Jas A Sanghera

(74) *Attorney, Agent, or Firm* — Zeigler IP Law Group, LLC

(57) ABSTRACT

A pill removal detection device for a blister package including a metallic element. Further, the pill removal detection device includes a detection means for detecting removal of a pill from the blister package. Yet further, the pill removal detection device includes an energy source, a sensor for detecting a change in capacitance of the metallic element of the blister package, means for communicating the detected change in capacitance to the detection means for waking up the detection means, and an attachment means for attaching the pill removal detection device to the blister package, the attachment means including an electrically conductive element connected to the sensor.

7 Claims, 4 Drawing Sheets

(56) References Cited

U.S. PATENT DOCUMENTS

2018/0104154 A1* 4/2018 Dantsker .............. G16H 40/67
2018/0289591 A1* 10/2018 French ................ A61J 7/0481

FOREIGN PATENT DOCUMENTS

| WO | 2012110700 A1 | 8/2012 |
| WO | 2015132811 A1 | 9/2015 |
| WO | 2017130207 A1 | 8/2017 |

* cited by examiner

PILL REMOVAL DETECTION DEVICE

TECHNICAL FIELD

The present disclosure relates generally to an electronic device; and more specifically, to a pill removal detection device for a blister package comprising a metallic element.

BACKGROUND

Caregivers, users and/or patients may forget to follow a prescription plan provided by a doctor. Generally, the medicines need to be taken according to the prescription plan for proper treatment. However, users often forget to take medicines, such as a daily pill like a birth control pill. Additionally, a user may end up consuming more pills than required, if the user does not remember if today's pill has been taken or not.

Accordingly, some users use a medicament dispenser, which includes seven small containers (one for each day of the week). Therefore, users may put pills to be consumed on each day of the week in the respective containers. Thereafter, they just need to open one container each day and take the pills available in the container. However, users need to take out pills from the blister packages before they store them in the containers. This may lead to contamination of the pills and uneven dosages per pill as a result of pills grinding against one another. Further, the medicament dispenser does not track and store information about the pill intake electronically.

Further, electronic devices that may be directly attached to a blister package are known in the art. These electronic devices typically include sensors (such as microphones) to register a sound of a dispensation of a piece of medicament from the blister package and a system arranged to register the time of dispensation. However, these devices consume a lot of power and they are not very accurate. The microphone consumes a considerable amount of energy. Further, there might be sounds which may be mistaken for pushing a pill through the blister package. For example, when the blister package is in a purse, the movement may sound like using the blister package.

Therefore, in light of the foregoing discussion, there exists a need to overcome the aforementioned drawbacks such as excessive power consumption and inaccurate detection of usage of the blister package.

SUMMARY

The present disclosure seeks to provide a pill removal detection device for a blister package comprising a metallic element. The pill removal detection device aims to substantially eliminate or at least partially address the aforementioned problems in the prior art, and to enable patients and caregivers to track the intake of medication. Further, the present disclosure seeks to provide a method for reducing the energy consumption of a pill removal detection device.

A typical pill removal detection device for a blister package comprising a metallic element comprises a detection means for detecting removal of a pill from the blister package. The pill removal detection device also comprises an energy source, a sensor for detecting a change in capacitance of the metallic element of the blister package, means for communicating the detected change in capacitance to the detection means for waking up the detection means, and an attachment means for attaching the pill removal detection device to the blister package, the attachment means comprising an electrically conductive element connected to the sensor.

Further, the present disclosure also relates to a method for reducing the energy consumption of the pill removal detection device as described above. The method comprises detecting a change in capacitance of the metallic element of the blister package. Further, the method comprises using the detected change to wake up the detection means to detect removal of a pill from the blister package. Furthermore, the detection means are configured to return to sleep mode after a pre-determined period of time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
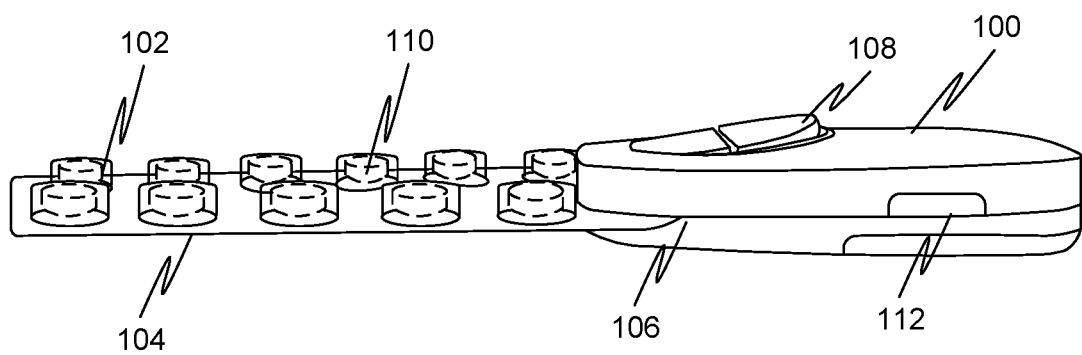
FIG. 1 is a perspective view of a schematic of a pill removal detection device in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, a pill removal detection device for a blister package comprising a metallic element is disclosed. The device comprises a detection means for detecting removal of a pill from the blister package. Further, the pill removal detection device comprises an energy source, a sensor for detecting a change in capacitance of the metallic element of the blister package, means for communicating the detected change in capacitance to the detection means for waking up the detection means, and an attachment means for attaching the device to the blister package. The attachment means comprising an electrically conductive element connected to the sensor.

Embodiments of the present disclosure substantially eliminate or at least partially address the aforementioned problems in the prior art, and enables patients and caregivers to track the intake of medication. For example, the disclosed pill removal detection device detects if a daily pill has been taken. The pill removal detection device may work with various types of blister packages, such as Alu-Alu blister packages and blister packages with aluminium lidding foil.

Further, the pill removal detection device accurately detects removal of a pill from the blister package. For example, a user may be walking with the pill removal detection device in her purse. Therefore, the pill removal detection device may move within the purse as the user is walking. However, the pill removal detection device does not interpret this movement as removing a pill from a blister package as it does not detect any change in capacitance of the metallic element of the blister package.

Moreover, the detection means (such as microphone) is activated only when a change is detected in the capacitance of the metallic element of the blister package. This way, detection means is activated only when there is certainty that a user is holding the pill removal detection device in hand (as touching the metallic element results in change of capacitance of the blister package). Accordingly, a considerable amount of power is saved in the energy source in the pill removal detection device. Further, this saves memory in the pill removal detection device as recording of audio or other action induced by the detection means would take place only if the pill removal detection device is being held in hand.

Further, the metallic element of the blister package, which is in electrical connection with the pill removal detection device, may be used as additional antenna element by a communication means. This will further reduce power consumption and enable longer connectivity distance.

Accordingly, embodiments of the present disclosure may extend operation time of the pill removal detection device for up to 2-3 years.

The data related to the pill removal may be temporarily stored in the pill removal detection device's internal memory. The data may include time stamps related to each pill removal detection. Thereafter, the data may be sent to a smartphone, which may further send the data to a cloud server. The pill removal detection device's internal memory may be sufficient to store up to a year of pill removal detection data.

Yet further, the pill removal detection device may have a button to switch ON the pill removal detection device if needed. Alternatively, the button may be used for pairing the pill removal detection device with the smartphone. For example, pressing the button may initiate Bluetooth scanning procedure to detect the smartphone.

The disclosed pill removal detection device is a sustainable and reusable device. Once a blister package is completely empty, the blister package may be removed from the pill removal detection device and a new blister package may be inserted in the pill removal detection device. The pill removal detection device may further help in reducing wastage of medicines. The pill removal detection device is suitable for mass market for tracking pills in blister packages.

The blister package is a pre-formed plastic packaging used for packaging small consumer goods, foods, and pharmaceuticals (generally pills). The blister package protects pills against external factors, such as humidity and contamination for extended periods of time. The main component of a blister package is a series of cavities in a sheet made from a thermoformed plastic. This is supported by a seal made of aluminium foil or any other suitable metal. The seal may constitute the metallic element.

In some embodiments, the detection means for detecting removal of a pill from the blister package may be selected from a first accelerometer, a first microphone, and a fusion sensor. For example, the first microphone may be configured to listen to ambient sounds (or sound of the blister package directly by having a microphone in mechanical contact with the blister package via the attachment means). For example, if an ambient sound is found to have characteristic(s) similar to the sound produced while taking a pill through the blister package, then the detection means may detect removal of a pill. Similarly, one or more of the first accelerometer, the first microphone may be configured to track values of corresponding parameters to detect removal of a pill. Additionally or alternatively the detection means can be selected from a pressure sensor, a temperature sensor, a resistivity sensor, a capacitance sensor, a proximity sensor, a camera sensor or an ultrasonic sensor. The pressure sensor can be configured to detect if the package is pressed with fingers with a sufficient force to remove a pill. The temperature sensor can be configured to detect if there is a change of temperature of the blister package in a certain area. The temperature change can be determined to correspond to removal of a pill in said area. The resistivity sensor can be configured to detect a change in resistivity of a blister package seal element. In said example the seal element has a set of printed wires which get broken (thus changing resistivity) as a pill is pressed through the seal. The capacitance sensor can be configured to measure a long-term capacitance change. The long-term capacitance change refers to measuring capacitance of the blister package after suspected pill removal and comparing that to a previous long-term capacitance value. The measurement of the long-term capacitance change is carried out when the user is not touching the blister package any more to differentiate impact of the user touching the blister package from the measurement. The proximity sensor can be configured to detect if a finger of a user is in proximity of certain area of the blister package. The camera sensor can be configured to take images of the blister package. Image analysis can be used to determine if a pill has been taken. The ultrasonic sensor can be configured to send ultrasonic impulses to the blister package and record reflecting ultrasonic sound. By comparing two different recorded reflected ultrasonic sounds the system can be used to determine if a pill has been removed. Change of reflection pattern corresponds to removal of the pill.

Further, the fusion sensor may include a second microphone, and a second accelerometer. The second accelerometer may be configured to detect a movement of the pill removal detection device and to communicate the movement of the pill removal detection device to the second microphone to wake up the second microphone. Thereafter, the second microphone may listen to ambient sounds to detect removal of a pill. Therefore, the audio is recorded by the second microphone only when a movement is detected by the second accelerometer. This further saves power. The terminology "second" does not necessary imply that there are two microphones and/or two accelerometers. Furthermore, the device may comprise more than one detection means, either identical or different.

In further embodiments, the pill removal detection device may further include a memory to store one or more of the characteristic sound pattern(s), the characteristic accelerometer pattern(s) and the characteristic capacitance pattern(s) related to the action of taking a pill out of a blister package. Accordingly, the detection means may be configured to compare a detected sound/accelerometer/capacitance pattern with the corresponding stored sound/accelerometer/capacitance pattern to detect a match, similarly if another type of detection means is used.

In some embodiments, the energy source may be any conventional battery including, but not limited to, sizes AAA, AA, A, B, C, D, coin cells (such as CR2032), button cells, rectangle cells, and cellular phone cells. Further, the energy source may be configured to store harvested energy. The harvested energy may include energy derived from external sources, such as solar power, RF energy, thermal energy, wind energy, and kinetic energy.

In some embodiments, the sensor for detecting a change in capacitance may include one or more electrodes configured to detect small changes in the capacitance. Further, the capacitance change may be detected with an appropriate Integrated Circuit (IC). Therefore, when a user touches the metallic part of the blister package, the sensor detects a change in the capacitance and recognizes a touch.

In some embodiments, the means for communicating the detected change in capacitance to the detection means may include one or more of a wired and a wireless connection. Further, the means for communicating the detected change in capacitance may send a signal to the detection means indicating the detected change in capacitance. For example, the wireless connection may include, but is not limited to, Wi-Fi, Bluetooth, Z-wave, and ZigBee. The detection means may be initiated (or turned ON) when a signal is received via the means for communicating the detected change in capacitance. Once initiated, the detection means detects if the actual removal of pill takes place or not. Therefore, the high power consuming detection means is initiated only when a capacitance change is detected. This saves a lot of power.

In some embodiments, the attachment means for attaching the pill removal detection device to the blister package may include a first element and a second element facing the first element. The blister package may be arrangeable between the first element and the second element. Further, at least the second element is an electrically conductive element. For example, the attachment means may include sharp teeth-like elements that grab the blister package. Alternatively, the attachment means may include, but is not limited to, one or more of a screw, a fastening clip and a rivet that grabs the blister package. Further, the attachment means may include a wallet-type encasing to grab the blister package.

In some embodiments, the sensor for detecting a change in capacitance is electrically connected to one or both of an upper jaw or a lower jaw of the attachment means. The upper jaw includes metallic teeth to puncture through the blister package and to form an electrical connection with the metallic part of the blister package. Further, the lower jaw may also include metallic teeth. For example, the metallic teeth may make two holes in the blister package. The two holes may be made in a free space available on the edge of the blister package. For example, 6-9 mm free space may be sufficient to make the holes in the blister package. Since the metallic element of the blister package is in electrical connection with one or both of the upper jaw and the lower jaw, it may be used as an additional antenna element for the communication module. According, one or more of the upper jaw and the lower jaw may be in electrical connection with an antenna of the communication module. This will reduce power consumption further and enable longer connectivity distance.

Further, a microphone may be mechanically connected to one or both of the upper jaw and the lower jaw to ensure a good audio path from the blister package. The upper jaw and the lower jaw may be covered with an upper frame and a lower frame. The lower frame may also include springs to ensure sufficient force is applied to the blister package with the one or both of the upper jaw and the lower jaw. The blister package may be removed by pressing button mechanically connected to the upper jaw. Further, a battery lid may be used to replace a battery unit when needed.

In some embodiments, the pill removal detection device may further include means for registering time and a memory. For example, the means for registering time may include a microcontroller or a microprocessor obtaining the time information from one or more of a real-time clock (RTC) in the pill removal detection device, a smartphone and the Internet. Accordingly, every time the detection means detects the removal of a pill from the blister package, the corresponding time is registered within the memory of the pill removal detection device.

In some embodiments, the pill removal detection device may be an Internet of Things (IoT) device. Accordingly, the pill removal detection device may further include a processor configured to communicate with the detection means and with an external computing system via a communication means. For example, the communication means may communicate via one or more of Wi-Fi, Bluetooth, Z-wave, and ZigBee. Further, the communication means may include a radio frequency transmitter-receiver module, and an antenna. The antenna may be electrically connected to the electrically conductive element of the attachment means. Further, the metallic element of the blister package, which is in electrical connection with the pill removal detection device, may be used as additional antenna element by the communication means. This will further reduce power consumption and enable longer connectivity distance.

In further embodiments, the external computing system may be one of a smartphone, a tablet, a PDA, a laptop, and a desktop. Accordingly, a user may be able to retrieve information from the pill removal detection device in the external computing system. For example, the user may use a smartphone application to retrieve and review the information received from the pill removal detection device. Further, the external computing system may include a cloud server. A third party, such as a doctor, may access the information the cloud server. Yet further, the user may use the smartphone application to retrieve and review the information from the cloud server.

In another aspect, a method for reducing energy consumption of the pill removal detection device is disclosed. The method includes detecting a change in capacitance of the metallic element of the blister package. Further, the method includes using the detected change to wake up the detection means to detect removal of a pill from the blister package. The detection means is configured to return to sleep mode after a pre-determined period of time.

Further, the detection means for detecting removal of a pill from the blister package may be a fusion sensor comprising a second microphone, and a second accelerometer. Accordingly, the method may include detecting a movement of the device by the second accelerometer, and communicating the movement of the pill removal detection device to the second microphone to wake up the second microphone.

Further, the method may include detecting attachment of the pill removal detection device to the blister package, based on at least two changes in capacitance with respect of time.

The present disclosure provides a pill removal detection device which consumes less energy, therefore it can last longer. Further, the pill removal detection device detects removal of pill from a blister package more accurately.

DETAILED DESCRIPTION OF THE DRAWINGS

FIG. 1 is a perspective view of a pill removal detection device 100, in accordance with an embodiment of the present disclosure. The pill removal detection device 100 is attached to a blister package 102. The blister package 102 has a metallic element 104 on one side. The blister package 102 is inserted in a slot 106 of the pill removal detection device 100. The blister package 102 may be removed from the pill removal detection device 100 by pressing a button 108. The pill removal detection device 100 further comprises a detection means (such as a microphone or an accelerometer etc.) to listen to sounds (or track vibrations) emanating from the blister package 102, when a pill 110 is removed (or pressed through) from the blister package 102. Yet further, the pill removal detection device 100 has a button 112 to switch ON the pill removal detection device 100 if needed. Alternatively, the button 112 may be used for pairing the pill removal detection device 100 with a smartphone. For example, pressing the button 112 may initiate Bluetooth scanning procedure to detect the smartphone.

Figure 2:
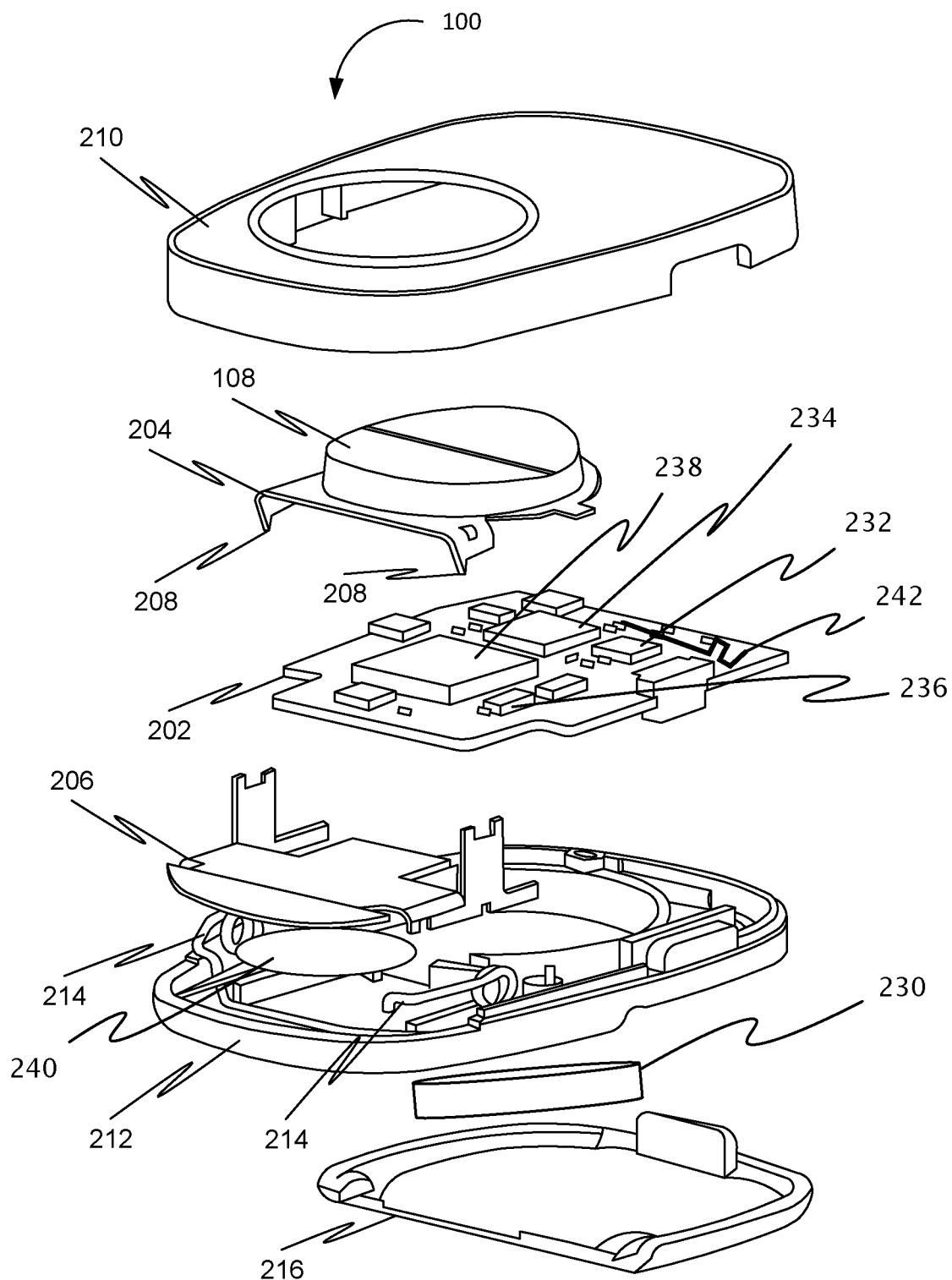
FIG. 2 is an exploded view of a schematic of the pill removal detection device of FIG. 1.

FIG. 2 is an exploded view of a schematic of the pill removal detection device 100. The pill removal detection device 100 includes a circuit board 202, which may include a microcontroller 238, a communication module 234 and other related electronics such as a sensor for detecting a change in capacitance 236 and an accelerometer sensor 232. The sensor for detecting a change in capacitance 236 is electrically connected to one or both of an upper jaw 204 or a lower jaw 206. The upper jaw 204 includes metallic teeth 208 to puncture through the blister package 102 and to form an electrical connection with the metallic part 104 of the blister package 102. Further, the lower jaw 206 may also include metallic teeth (not shown). For example, the metallic teeth 208 may make two holes in the blister package 102. The two holes may be made in a free space available on the edge of the blister package 102. For example, 6-9 mm free space may be sufficient to make the holes in the blister package 102. Since the metallic element 104 of the blister package 102 is in electrical connection with one or both of the upper jaw 204 and the lower jaw 206, it may be used as an additional antenna element for the communication module 234. According, one or both of the upper jaw 204 and the lower jaw 206 may be in electrical connection with an antenna 242 of the communication module 234. This will reduce power consumption further and enable longer connectivity distance.

Further, a microphone 240 may be mechanically connected to one or both of the upper jaw 204 and the lower jaw 206 to ensure a good audio path from the blister package 102. In present FIG. 2 the microphone is a piezo microphone connected to the lower jaw 206.

The circuit board 202, the upper jaw 204 and the lower jaw 206 may be covered with an upper frame 210 and a lower frame 212. The lower frame 212 may also include springs 214 to ensure sufficient force is applied to the blister package 102 with the one or both of the upper jaw 204 and the lower jaw 206. The blister package 102 may be removed by pressing button 108 mechanically connected to the upper jaw 204. Further, a battery lid 216 may be used to replace a battery unit (energy source) 230 when needed.

Figure 3:
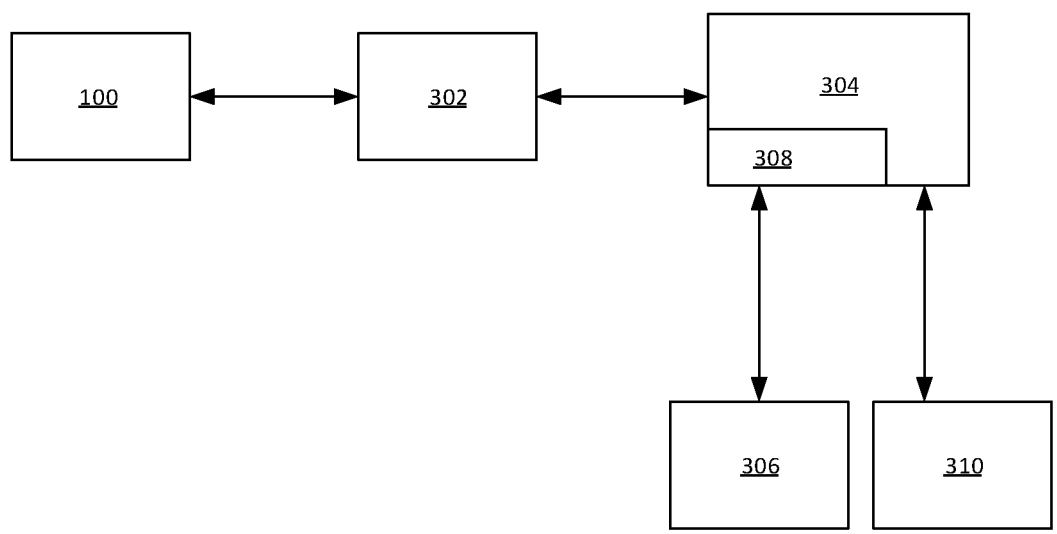
FIG. 3 is a block diagram showing the communication between the pill removal detection device of FIG. 1 and an electronic communication device.

FIG. 3 is a block diagram showing the communication between the pill removal detection device 100 and an electronic communication device 302 in accordance with some embodiments. The electronic communication device 302 may be one of a smartphone, a tablet, a PDA, a laptop, and a desktop. The pill removal detection device 100 may send information to the electronic communication device 302 via one of a wired and a wireless connection. The wireless connection may include one or more of Wi-Fi, Bluetooth, Z-wave, and ZigBee. Further, an application installed on the electronic communication device 302 may receive information from the pill removal detection device 100.

Thereafter, the electronic communication device 302 may forward the information to a cloud server 304. For example, the application installed on the electronic communication device 302 may forward the information to the cloud server 304. The information may be forwarded via one or both of a Representational State Transfer (REST) Application Programming Interfaces (APIs) and Hypertext Transfer Protocol over Secure Socket Layer (HTTPS).

Thereafter, the information stored on the cloud server 304 may be accessed by the third parties 306. The third parties may include, but is not limited to, nurses, doctors, caregivers, and family members of patients. The third parties 306 may access the information via REST APIs 308 provided by the cloud server 304. Moreover, the cloud server 304 may provide a user interface 310, which may be accessed by a user over HTTPS connection, for example, via a website.

Figure 4:
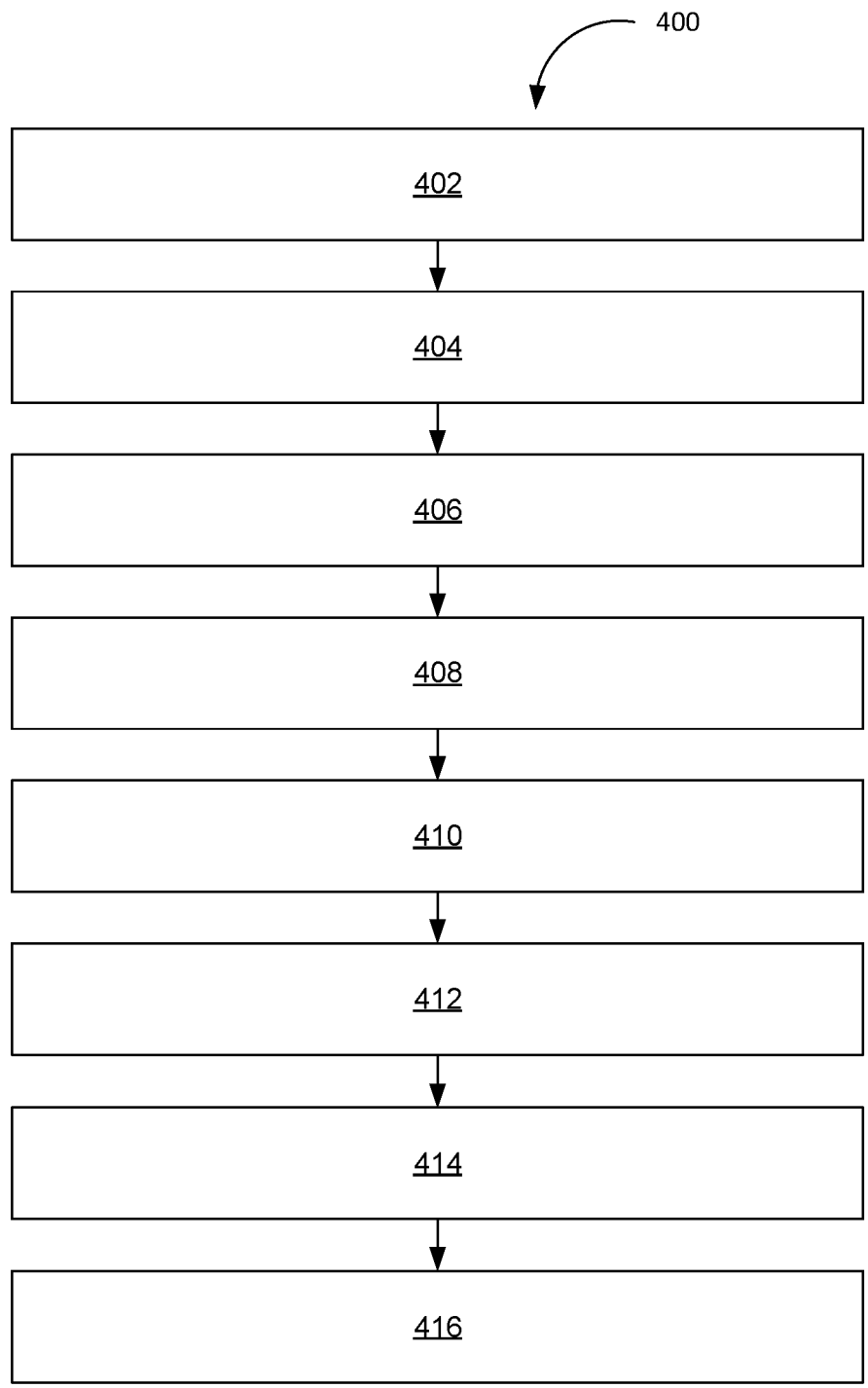
FIG. 4 is a flowchart of a method for reducing energy consumption of the pill removal detection device of FIG. 1 in accordance with an embodiment of the present disclosure.

FIG. 4 is a flowchart of a method for reducing the energy consumption of a pill removal detection device. At 402, the method 400 includes inserting a blister package in a slot of the pill removal detection device. At 404, the method 400 includes measuring a capacitance value using a capacitance measurement sensor to get a first value of capacitance. For example, the capacitance value may be measured via an electrical connection from a metallic element of the blister package via one or both of an upper jaw and a lower jaw of the pill removal detection device.

At 406, the method 400 includes measuring the capacitance value at predetermined intervals. Alternatively, the capacitance value may be measured continuously. If a change greater than predetermined threshold is detected in the capacitance value, then the method 400 includes initiating a wake up procedure at 408. In response, the method 400 includes initiating the detection means of the pill removal detection device at 410. For example, an audio sensor (or a microphone) may be initiated.

At 412, the method 400 includes recording and analysing an audio recorded by the detection means. The analysis may include finding characteristic sound pattern(s) associated with sound of pushing a pill through the blister package from the recorded audio. After analysis, if it is determined that a pill is pushed through the blister package then a time stamp is recorded. The analysis may be performed in the pill removal detection device. Alternatively, an audio sample may be sent to an external device (such as an electronic communication device and a cloud server) for analysis.

At 414, the method 400 includes sending the information (including one or more time stamps when a pill was removed) to the electronic communication device. The electronic communication device keeps track on times when the pill has been removed from the blister package. Further, the electronic communication device may give warning if there are too many pills are taken or of the pill has not been taken on time. The electronic communication device may be configured to present information related to the number of pills taken, time stamps related to the pills taken and if the prescribed rate of medicine intake has been followed.

At 416, the audio sensor is turned OFF. Thereafter, the audio sensor remains in a hibernating state.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A pill removal detection device for a blister package comprising a metallic element, the pill removal detection device comprising:
   - detection means for detecting removal of a pill from the blister package,
   - an energy source,
   - a sensor for detecting a change in capacitance of the metallic element of the blister package,
   - a sensor for communicating the detected change in capacitance to the detection means for waking up the detection means,
   - attachment means for attaching the pill removal detection device to the blister package, the attachment means comprising an electrically conductive element connected to the sensor, wherein the detection means is further configured to:
     - use the detected change in capacitance to wake up the detection means to detect removal of the pill from the blister package; and
     - return to sleep mode after a pre-determined period of time;
   - wherein the detection means is a fusion sensor comprising a microphone, and an accelerometer, the accelerometer being configured to detect a movement of the pill removal detection device, the detection means configured to communicate the movement of the pill removal detection device to the microphone to wake up the microphone.

2. The pill removal detection device according to claim 1, wherein the attachment means for attaching the device to the blister package comprises a first element and a second element facing the first element, wherein the blister package is arrangeable between the first element and the second element, and at least the second element is the electrically conductive element.

3. The pill removal detection device according to claim 1, further comprising a processor configured to communicate with the detection means and with an external computing system via a communication means.

4. The pill removal detection device according to claim 3, wherein the communication means comprises
   - a radio frequency transmitter receiver module, and
   - an antenna, the antenna being electrically connected to the electrically conductive element of the attachment means.

5. The pill removal detection device according to claim 1, further comprising means for registering time and a memory.

6. A method for reducing energy consumption of a pill removal detection device, the method comprising:
   - detecting a change in a capacitance of a metallic element of a blister package,
   - using the detected change to wake up detection means to detect removal of a pill from the blister package,
     - wherein the detection means is configured to return to sleep mode after a pre-determined period of time; and
   - wherein the detection means is a fusion sensor comprising a microphone, and an accelerometer, and the method further comprises detecting a movement of the pill removal detection device by the accelerometer, and communicating the movement of the pill removal detection device to the microphone to wake up the microphone.

7. The method according to claim 6, further comprising detecting attachment of the pill removal detection device to the blister package, based on at least two changes in capacitance with respect of time.

\* \* \* \* \*